United States Patent [19]

Squires

[11] 3,957,953

[45] May 18, 1976

[54] TREATING GAS WITH CATALYTIC DUST IN PANEL BED

[76] Inventor: Arthur M. Squires, 245 W. 104 St., New York, N.Y. 10025

[22] Filed: Sept. 19, 1974

[21] Appl. No.: 507,385

[52] U.S. Cl. .................................. 423/244; 55/98; 423/574 R
[51] Int. Cl.² ...................... C01B 17/00; B01J 8/00
[58] Field of Search ........................... 423/242–244, 423/574; 55/98, 282

[56] References Cited
UNITED STATES PATENTS

| | | | |
|---|---|---|---|
| 3,296,775 | 1/1967 | Squires | 55/282 |
| 3,637,352 | 1/1972 | Bratzler et al. | 423/574 |
| 3,781,408 | 12/1973 | Lin | 423/244 |

FOREIGN PATENTS OR APPLICATIONS

| | | | |
|---|---|---|---|
| 1,183,937 | 3/1970 | United Kingdom | 423/244 |

Primary Examiner—Oscar R. Vertiz
Assistant Examiner—Gregory A. Heller
Attorney, Agent, or Firm—Abraham A. Saffitz

[57] ABSTRACT

A panel bed fitted for puffback cleaning is provided with an arrangement for supplying a precoat surface layer deposit of a fine catalytic particulate medium, significantly finer in size than the granular material charged to the panel bed, at each gas entry surface of the panel. The modified panel bed is advantageous for converting sulfur dioxide and oxygen present in combustion products of a fuel containing sulfur to sulfur trioxide, which may then advantageously be absorbed by limestone particles charged to the panel bed. Particles at least partially converted to calcium sulfate would be removed from the panel bed periodically by puffback for their disposal. Sulfur dioxide may also be converted to elemental sulfur by catalytic reactions and adsorbed on activated carbon in the panel bed.

11 Claims, 4 Drawing Figures

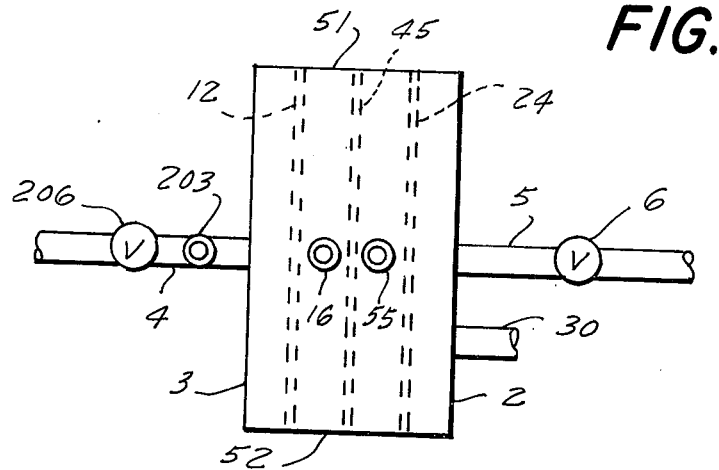
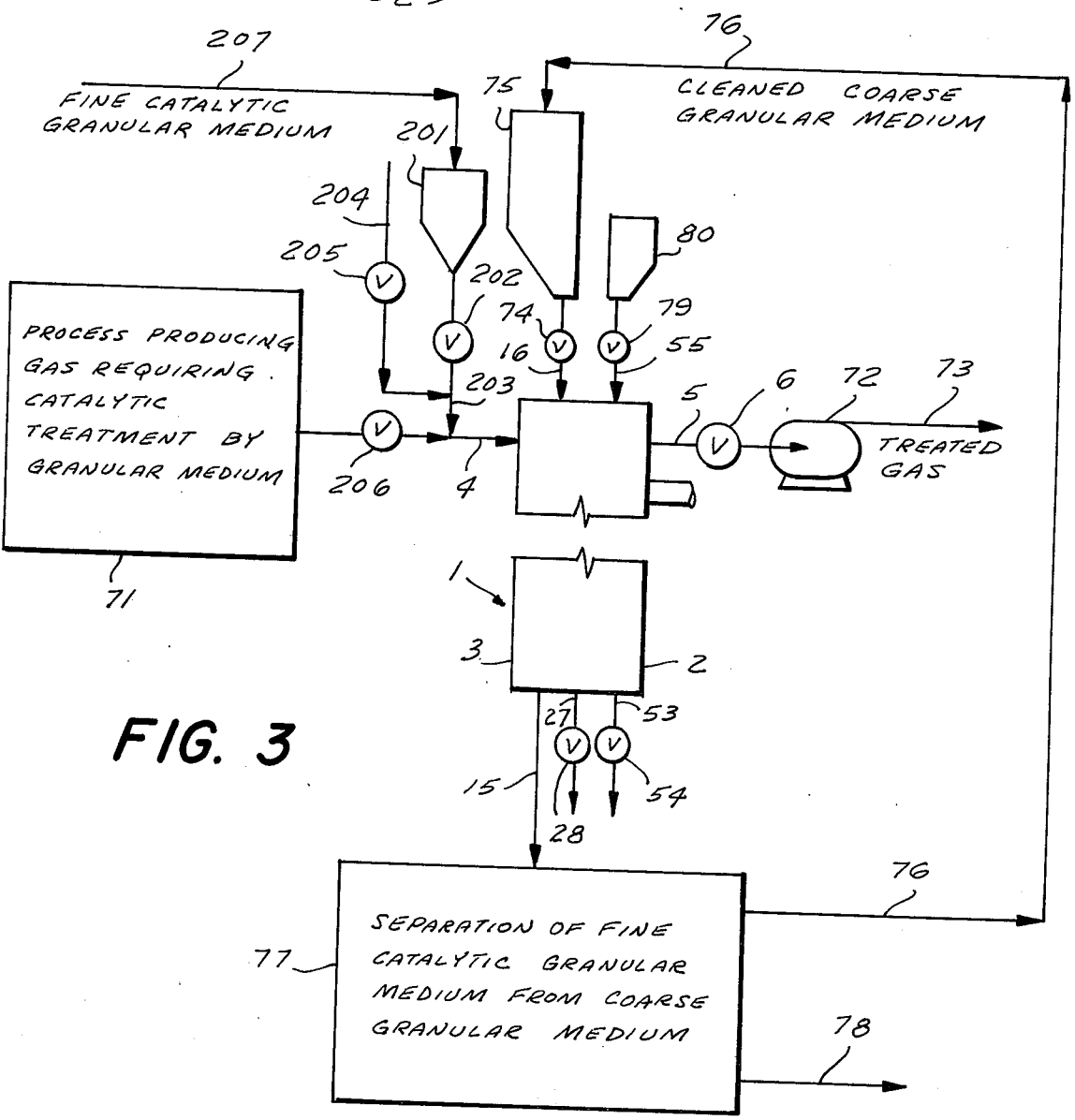

TREATING GAS WITH CATALYTIC DUST IN PANEL BED

CROSS-REFERENCE TO RELATED APPLICATIONS

This application is related to my co-pending applications, filed on Aug. 28, 1974, numbered and entitled as follows:
1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to my co-pending applications, filed simultaneously herewith, numbered and entitled as follows:
5. Electrostatic Filtration in Panel Bed, Ser. No. 507,387
6. Precoating Panel Bed for Filtering Aerosol of Micron-Size Particulates, Ser. No. 507,403
7. Treating Gas with Chemically Reactive Dust in Panel Bed, Ser. No. 507,386
9. Solid-Gas Heat Exchange in Countercurrent Contacting of Gas and Granular Material in Panel Bed, Ser. No. 507,398
10. Treating Gas and Wetted Granular Material in Panel Bed, Ser. No. 507,377
11. Treating Liquid and Granular Material in Panel Bed, Ser. No. 507,376

The instant application is the eighth of this sequence.

FIELD OF THE INVENTION

The invention relates to the contacting of a catalytic dust with a gas by a panel bed of granular material having gas entry faces and fitted for puffback cleaning. In an important aspect of the invention, it is useful for converting sulfur dioxide in combustion products to sulfur trioxide and effecting absorption of the sulfur trioxide by limestone or lime. By the method of the invention, the panel bed can simultaneously be useful in removing particulate matter from the gas undergoing treatment.

DESCRIPTION OF THE PRIOR ART

My aforementioned co-pending application number 1, "Treating Gas and Granular Material in Panel Bed", furnishes a review of prior art relating to panel beds, with emphasis upon art relating to techniques for removing spent granular material, together with filtered dust if any is present, from fluid entry surfaces of such panels. I incorporate this review in the instant application by reference.

My earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number 1, "Treating Gas and Granular Material in Panel Bed", provides a more particular characterization of a reverse transient flow of gas (i.e., puffback) to produce a movement of granular material in mass (a "body movement") toward the gas entry faces of a panel bed.

My aforementioned co-pending application number 2, "Filtering Dusty Gas in Improved Panel Bed", provides an improved chevron louver for support of gas entry faces of a panel bed, with the advantage that filtered dust penetrating the bed is not dragged downward in the general motion of solid in the panel bed that follows puffback cleaning.

GENERAL DESCRIPTION OF THE INVENTION

Experiments with deposits of fly ash upon the surface of a bed of sand, more fully described in the aforementioned co-pending application number 6, "Precoating Panel Bed for Filtering Aerosol of Micron-Size Particulates," together with my aforementioned more particular characterization of a reverse transient flow for practice of puffback cleaning of a panel bed, brought me to discover a procedure for treating a gas by a deposit of a fine catalytic powder on each gas entry face of a panel bed to convert a species in the gas to a species that may more readily react with granular material of the bed.

OBJECTS OF THE INVENTION

An object of the invention is to provide a method for contacting a gas with a fine catalytic powder.

Another object is to provide a method for contacting a gas with a powder than can be provided more conveniently in a finely divided form.

Another object is to provide a method for removing sulfur dioxide from combustion products.

Another object is to provide a method for removing both sulfur dioxide and particulate matter from combustion products.

Another object is to provide a method for contacting a gas with a fine catalytic powder at high temperature.

Another object is to provide a method for removing sulfur dioxide from a gas containing both sulfur dioxide and oxygen, such as many industrial waste gases including fuel combustion products and offgases from a smelter processing a sulfide metal ore.

SUMMARY OF THE METHOD FEATURES OF THE INVENTION

My invention relates to an improved method of treating a gas through its contacting with a fine chemically catalytic granular medium. Granular material is arranged in a panel bed having a plurality of transversely disposed, upwardly spaced, gas entry portions separated by interposed supporting members having outer and inner edges. The gas entry portions have gas entry faces that are substantially contiguous with these outer edges. The granular material is smaller than about 20 mesh and preferably larger than about 100 mesh. The bed has gas exit portions spaced horizontally apart from the inner edges of the supporting members. A gas is caused to flow forwardly through the gas entry portions of the bed and outwardly from the gas exit portions while adding to the gas a fine catalytic granular medium substantially smaller than about 120 mesh and preferably smaller than about 200 mesh. The fine granular medium separates and accumulates in surface layer deposits on the gas entry faces. The fine medium is catalytic toward at least one chemical reaction by one or more chemical species present in the gas to be treated. The medium is preferably added to the gas at a rate less than about 10 grams per cubic meter ($gm/m^3$) of the gas, and better still, less than about 5 $gm/m^3$. The gas enters the gas entry faces at a velocity greater than about 16 feet per minute (ft/min) during at least a part of the step of putting down the surface layer deposits. Thereafter, a transient flow of gas is caused to move in the direction in reverse to the aforementioned flow of gas to which the fine granular medium is added. The transient reverse flow produces first a rise (at a given rate of rise) and subsequently a fall in the pressure difference between the gas exit portions and the gas entry portions of the panel bed. This difference should remain greater than a first critical minimum difference for a time interval of less than about 150 milliseconds, and preferably for a time interval less than about 50 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material from the bed along with substantially all of the deposits of the fine granular medium. The second critical minimum difference depends upon the rate of rise in the pressure difference, being larger the the more rapid the rise. Granular material is added to the bed to replace material spilled from the gas entry portions of the bed. The cycle of putting down precoat surface layer deposits, as hereinbefore described, and of causing a transient flow of gas to move in the aforementioned reverse direction and of adding granular material to the bed is repeated two more times, and the precoat deposits are put down a fourth time. Gas to be treated is also caused to flow forwardly into and from the panel bed, this gas containing the chemical species whose reaction it is desired for the catalytic medium to bring about. The gas is treated through its contact with the surface layer deposits. The cycle of operation, including the putting down of the precoat deposits and the treating of the gas to be treated, the causing of the reverse transient flow of gas, and the adding of granular material, is repeated in a cyclic manner.

For convenience of reference, I use the term puffback for the specified reverse transient flow of gas and the term puffback cleaning to denote the operation whereby granular material is spilled from the gas entry portions of the panel bed.

The first aforementioned gas, that contains the fine granular medium to be deposited at gas entry faces, and the second aforementioned gas, the gas to be treated, are sometimes advantageously one and the same. The fine catalytic granular medium may sometimes advantageously be added only during an early part of the time interval during which the gas is treated before the puffback cleaning of the panel bed. Alternatively, the fine catalytic medium may sometimes advantageously be present in the gas throughout the gas-treating time period.

The aforementioned velocity of 16 ft/min is approximately the lower limit for putting down a surface layer deposit of adequate toughness against spalling and cracking under influence of vibrations and hard knocks and sudden changes in gas flow that produce sudden changes in pressure difference across the deposits. I prefer a velocity greater than about 30 feet per minute for at least a portion of the step of putting down the surface layer deposits, and a velocity greater than about 60 ft/min is even better. The higher velocities have the virtue that the deposits put down more and deeper roots into the sand bed, tying the deposits to the bed and rendering the deposits tougher and more resilient, as explained in greater detail in the aforementioned co-pending application number 6.

If a higher efficiency of contacting of gas and the deposits is desired, it is advantageous to put down a first portion of the deposits at the aforementioned higher velocities, but in any case at a velocity greater than about 16 ft/min, and subsequently to put down a second portion of the deposits at a velocity below about 16 ft/min and preferably below about 12 ft/min. The second portion has the effect of closing up pinhole defects in the first portion, i.e., craters or pinholes in the deposits through which gas can pass directly into the granular material bed, substantially bypassing the deposit and escaping treatment. For a fuller discussion of the role and effect of the later step of putting down a second portion of the deposits at a low velocity, see the aforementioned co-pending application number 6.

An example where the gas that deposits the medium and the gas to be treated are often advantageously the same gas arises from the need to remove both vanadium pentoxide fume and sulfur dioxide gas from the products of combustion of a residual fuel oil containing both vanadium and sulfur. The vanadium pentoxide fume is catalytic toward conversion of sulfur dioxide by its reaction with the oxygen usually present in the combustion products to form sulfur trioxide. The fume is advantageously accumulated in the aforementioned deposits along with larger granules of vanadium pentoxide that may advantageously be provided by pelletizing or otherwise agglomerating the fume particles to provide granules advantageously between about 10 and 40 microns in diameter. The fume is of course present in the gas to be treated throughout a gas-treating time period between two successive puffback cleanings. The larger granules are advantageously added only during an early part of the time period.

If slippage of vanadium pentoxide fume through the panel bed during an early part of the gas-treating period, according to the abovedescribed procedure, cannot be tolerated, the larger granules of vanadium pentoxide are advantageously put down in a separate step using a gas already cleaned by another panel bed of the invention, this step being followed by a gas treatment step that is wholly subsequent to the step of putting down the surface layer deposits of the larger granules.

In this application, the granular material of the panel bed proper is preferably absorptive in respect to sulfur trioxide. A suitable granular material is calcium carbonate or lime or half- or fully-calcined dolomite. The temperature of the operation should be around 800° to 900°F, and if the combustion takes place in a steam boiler of conventional design, the gas to be treated may conveniently be withdrawn ahead of the boiler's economizer.

The granular material of the panel bed is advantageously dirtied by the aforementioned granules by admixing the granules with the granular material before it is charged to the panel bed, so that catalytic material is present throughout the panel bed to promote conversion of sulfur dioxide to sulfur trioxide in close proximity to absorptive material and to complete the removal of sulfur dioxide from the gas being treated.

It will be readily appreciated that this application has the virtue of removing both vanadium pentoxide fume and sulfur dioxide from the gas being treated, and of preventing both of these pollutants from reaching the environment.

The method as generally described above may also be used to remove sulfur dioxide from a wide range of gases containing both sulfur dioxide and oxygen, such as combustion products and waste gases from a smelter processing a metal sulfide ore. The surface layer deposits would comprise vanadium pentoxide advantageously of about the aforementioned size, and the granular material of the panel bed would advantageously comprise the aforementioned calcium carbonate, calcium oxide, half- or fully-calcined dolomite dirtied by additional granules of vanadium pentoxide.

Another procedure for removing sulfur dioxide from the product of combustion of a fuel containing sulfur would be to provide surface deposits of a medium catalytic for the reaction of sulfur dioxide with hydrogen sulfide to form elemental sulfur. Such catalytic media are well known to the art. Hydrogen sulfide would be added to the combustion product gas to be treated, and the granular material of the panel bed would advantageously comprise an adsorbent or absorbent for elemental sulfur, such as activated carbon. Another alternative that may sometimes be preferred would be to provide surface deposits of a medium catalytic for the reaction of sulfur dioxide with carbon monoxide to yield elemental sulfur. Such media are known to the art. Carbon monoxide would be added to the gas to be treated, and a solid adsorbent or absorbent for sulfur would be provided in the panel bed proper.

In all of its aspects, the panel bed of the invention is also useful for removing particulate material from the gas undergoing treatment.

BRIEF DESCRIPTION OF THE DRAWINGS

The invention will be more particularly described in conjunction with the following drawings wherein:

FIG. 2 is a top view of the panel of FIG. 1;

FIG. 3 is a schematic diagram illustrating use of the invention to contact a gas with a fine catalytic granular medium.

DESCRIPTION OF THE PREFERRED EMBODIMENTS

Figure 1:
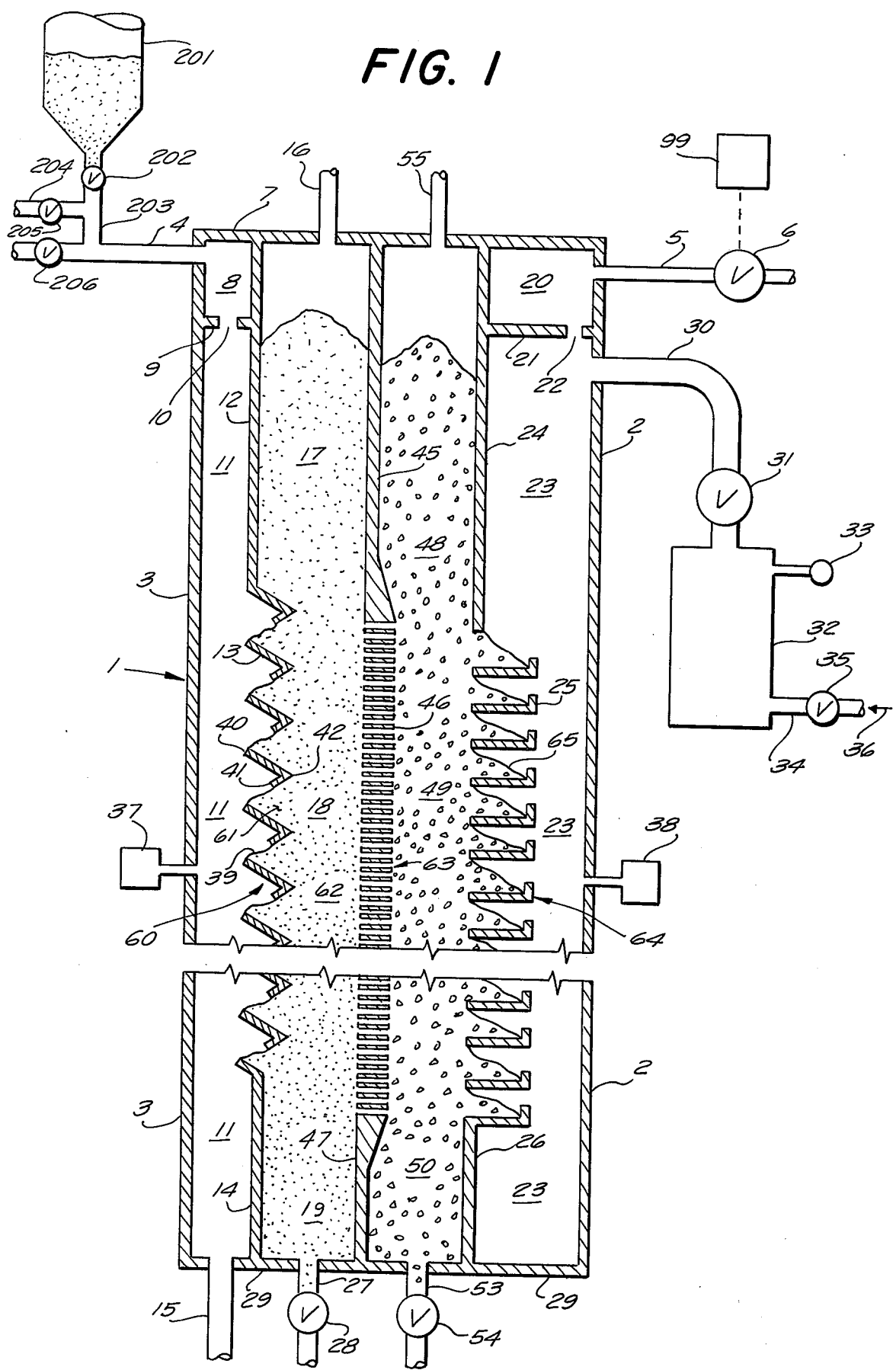
FIG. 1 is a vertical section view of a preferred panel bed gas-solid contactor with provision for providing a precoat of fine particles on gas entry faces.

In the several figures, like reference numerals refer to like parts having like functions. In FIG. 1 the panel bed gas-solid contactor 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular filter material 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular material, by means of pipe 27 and valve 28. Perforate wall 63 comprises a series of horizontal louvers or slats 46 mounted one above another in a structure resembling subway grating and narrowly spaced apart in the vertical direction. Horizontally spaced apart from wall 63 is perforate wall 64 comprising a series of generally horizontal louvers or slats 25 also mounted one above another. Granular material bed 49, comprising material considerably coarser in size than the material of bed 18, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be treated is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) via plenum space 20 to pipe 5. Louvers 25 cooperate to support gas exit surfaces 65 of bed 49.

Perforate wall 60 comprises a series of members 13. A member 13 typically has an upper surface with outer edge 40 and inner edge 42 in respect to granular bed 18, and cooperating therewith a lower surface with outer edge 41 and inner edge 42, the two inner edges being articulated together in an edge joint. The perforations of wall 60 are to be considered as being formed between respective inner edge joints 42 of adjacent members 13. The members 13 are mounted in a manner such that they cooperate to support gas entry portions 61 of bed 18, viz., the angle of a line drawn through edge 41 of a given member and edge 40 of the next subjacent member should preferably be less than about 25° from the horizontal, an angle less than the angle of repose of most granular materials that might preferably be employed in bed 18. It will be seen that the gas entry portions 61 are transversely disposed, upwardly spaced, and separated by the interposed supporting members 13, the gas entry portions having gas entry faces 39 that are substantially contiguous with outer edges 40. A line drawn through edge 41 of a typical member 13 and edge joint 42 of the subjacent member 13 is inclined at an angle less than about 60° from the horizontal. Gas exit portions of bed 18 are seen generally at 62, and are spaced from edge joints 42.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

Hopper 201 is provided for holding a granular material substantially smaller than the granular material of bed 18. The finer granular material of hopper 201 can be introduced into gas flowing in pipe 4 toward plenum 8 by opening valve 202. Line 4 is provided with valve 206, and an alternative source of gas to pipe 4 is provided from pipe 204 fitted with valve 205.

In operation of gas-solid contactor 1, the panel bed is initially charged with granular material, such as a quartz sand substantially smaller than 20 mesh (U.S. Standard) and preferably larger than about 100 mesh, from line 16, filling spaces 19, 18, and 17 as shown in FIG. 1. Supply hopper 75 (seen in FIG. 3) is conveniently provided to furnish the granular material to line 16 via valve 74. A second, coarser granular material is furnished from supply hopper 80 to line 55 via valve 79 and thence to fill spaces 50, 49, and 48. The second material is suitably a quartz sand of about 10–14 mesh. A fine chemically catalytic granular medium is supplied to hopper 201. Panel bed 1 is connected to a process 71, seen in FIG. 3, producing a gas benefitting from catalytic treatment by a granular medium via gas-entry pipe 4. A precoat of the fine catalytic granular medium is laid down on the gas entry surfaces 39 of bed 18 in a manner hereinafter described, and gas from process 71 is caused to flow forwardly through panel bed 1 by opening valve 6 in pipe 5 and valve 206 in pipe 4. Blower 72 is provided to carry gas from pipe 5 to line 73 for conducted treated gas from the system. Periodically, tank 32 is filled with gas at pressure from supply 36, valve 35 is closed, valve 6 is closed to interrupt the flow of gas being treated, and valve 31 is opened quickly to produce the specified transient reverse flow from compartment 23 to compartment 11. Pipe 15 is provided to withdraw precoat medium along with granular material spilled from surfaces 39. As seen in FIG. 3, pipe 15 advantageously conducts the spilled solids to means 77 for separating the fine catalytic granular medium from the granular material provided to bed 18, for example, by screening or elutriating the fine particles away from the granular material. Pipe 78 is provided for withdrawal of the fine catalytic medium from means 77, and pipe 76, for return of granular material to supply hopper 75. After a few seconds for dust to settle to the bottom of compartment 11, valve 31 is closed, and valve 6 is opened to resume treatment by the freshly cleaned bed 18.

If the fine catalytic medium in pipe 78 still has catalytic virtue toward the gas-treating reaction desired, it may sometimes advantageously be returned to hopper 201, preferably after a separation from other particulate matter, if any, that was originally present in gas to be treated and that accumulated together with the fine catalytic medium in the surface precoat deposits on gas entry surfaces 39.

Transducers 37 and 38, seen in FIG. 1, are conveniently provided in a test to determine the aforementioned first and second critical minimum pressure differences between space 23 and space 11, although competent fluid dynamicists will be able to calculate instantaneous pressure difference versus time in a test of puffback, given the porosity of beds 18 and 49, the size of valve 31, the speed of its opening, the size of tank 32, the pressure therein, the length and the diameter of line 30, and the dimensions of compartment 23. Tests for determining the critical pressure differences and illustrating the suitable limits on the time interval during which the puffback maintains the reverse pressure difference above the first critical minimum difference are discussed more fully in my aforementioned co-pending application number 1, "Treating Gas and Granular Material in Panel Bed", together with representative data, and this discussion is incorporated herein by reference. In brief, a time interval of about 150 milliseconds represents an approximate upper limit for acceptable performance, beyond which spills from individual gas entry surfaces 39 become badly distributed, there being far more spill from surfaces near the top of a panel like that seen in FIG. 1 than from surfaces near the bottom, and beyond which spills partake disadvantageously more of the character of a localized spill and less of the character of the preferred body movement. A practical minimum time interval for operation of the arrangement of FIG. 1 appears to be about 3 to 5 milliseconds, given the practical requirement that space 23 must be large enough to accommodate a flow of gas leaving wall 64. One might, for example, achieve an extremely short time interval by mounting a large number of blank cartridges on wall 2 and by firing them simultaneously to discharge gas explosively into space 23; or one might provide an arrangement whereby wall 2 might be displaced almost instantaneously toward wall 64.

I have conducted extensive experiments in which I deposited a layer of fly ash from the combustion of pulverized coal upon a horizontal surface of quartz sand. The fly ash that I used was substantially smaller than 120 mesh, about 3 per cent being removed if it was sieved through a 120-mesh screen. The experiments are more fully described in the aforementioned co-pending application number 6, and this discussion is incorporated herein by reference. My experiments showed that it is difficult to put down a coherent deposit of granular medium finer than about 120 mesh upon the surface of a quartz sand larger than about 20 mesh, when the medium has an adhesivity toward sand and an autohesivity comparable to fly ash. A larger granular material may be used if the medium has higher adhesivity toward the material and a higher autohesivity. See the discussion of adhesivity and autohesivity in the aforementioned co-pending application number 6. In the course of the experiments, I discovered procedures for putting down tough, coherent deposits of a fine granular medium on gas entry faces 39 of bed 18 as well as for preserving the coherency of the deposits during their use.

Where an unusually high efficiency of treatment is desired, I recommend a three-increment procedure for depositing the precoat surface layer deposits, described and elucidated in detail in the aforementioned co-pending application number 6, and also set forth in the co-pending application number 7.

Where a normal efficiency of contacting is sufficient, I recommend the following procedure. Bed 18 would be charged with 20–30 mesh quartz sand or preferably 20–60 mesh sand. Blower 72 would be started, and valves 6 and 205 would be opened to connect blower 72 with a source of clean gas, advantageously atmospheric air, via pipe 5, panel bed 1, pipe 4, pipe 203, and pipe 204. Control means 99 (seen in FIG. 1) would regulate the opening of valve 6 to maintain flow at a rate such that the velocity of the clean gas passing across gas entry faces 39 is preferably at least about 60 ft/min, and higher if convenient. Valve 202 would be opened to cause the fine catalytically active medium to flow from hopper 201 via pipe 203 into pipe 4 along with the clean gas and to be carried to gas entry faces 39 where the medium would accumulate in deposits. After a portion of the desired deposit has accumulated, the velocity of the gas entering gas entry faces 39 would be reduced to a velocity below about 16 ft/min and preferably between about 8 and 12 ft/min, and a second portion of the deposits would accumulate with the effect of closing up pinholes in the first portion.

After the desired deposit is put down, flow of gas from source 204 via valve 205 would be stopped, and valve 206 would be opened to commence treatment of the gas. Treatment would continue until the catalytic medium loses its virtue, or until the deposits develop pinhole or crack defects spoiling their effectiveness in contacting the gas to be treated, or until part of the deposits have spalled away into space 11 reducing their extent sufficiently to hurt performance unduly. Thereafter, puffback can clean and renew the panel bed, so that the cycle of operation can be repeated. Often the cycle of operation will be determined by accumulation of dust particles removed from the gas to be treated to build up an undesirably large pressure drop across the deposits and across the panel bed.

It is desirable that there be no sudden changes in rate of flow of the gas across panel bed 1, and control means 99 is conveniently arranged to ensure that valve 6 does not change its position except slowly.

If a lesser efficiency of contacting is acceptable, so that a reduced efficiency can be tolerated during an early part of a gas-treating period between successive puffback cleanings, the surface layer deposits of active medium may advantageously be put down with use of the gas to be treated, and pipe 204 and valve 205 may be omitted.

Best performance will be achieved if panel bed 1 is mounted so that it is free of vibrations that might spall the deposits into space 11 or crack them open and spoil their coherency. If vibration-free mounting is not possible, it would be advantageous to provide for sufficient bonds between adjacent particles of the fine catalytic medium to produce a reticulated network of particles in three dimensions. The bonds need not be very strong, but only just strong enough to provide the network with sufficient strength to resist spalling and cracking by vibrations of the type to be encountered or by typical expected change and rate of change in pressure drop. For each anticipated situation, the strength and number of the bonds are best determined by adjustment to the specific operating conditions, it being within the expected skill of the operator to adjust reticulation and to enhance reticulation as required or to diminish reticulation to the minimum just desirable for given operational circumstances.

The aforementioned co-pending application number 6 gives a discussion of reticulating agents, and I incorporate this discussion herein by reference. In brief, a solution or suspension or emulsion of a sticky material in a liquid can be introduced as a fine mist and admixed with the active granular medium, the liquid subsequently evaporating from the surface layer deposits. Many sticky materials can serve, including sodium silicate, asphalt, many polymerized or polymerizable materials, and so forth. A cementitious material, especially a quick-setting cement, can be used with supply of a little moisture for its hardening. It will be evident that the number and character of the bonds among the particles must be such that the reticulated network of granular medium particles remains porous to flow of the gas to be treated and that the medium retains its virtue for the desired gas treatment by catalysis.

The operation illustrated by FIG. 3 can serve to remove sulfur dioxide from products of a combustion 71 of a fuel containing sulfur by employing for the fine catalytic medium a known catalyst for conversion of sulfur dioxide to sulfur by reaction with hydrogen sulfide or carbon monoxide, by adding a small quantity of hydrogen sulfide or carbon monoxide to the gas in line 4, and by providing as the coarse granular medium to hopper 75 a suitable adsorbent or absorbent for elemental sulfur, such as activated carbon. Either operation would preferably be conducted at a temperature in the neighborhood of 250° to 400°F.

Figure 4:
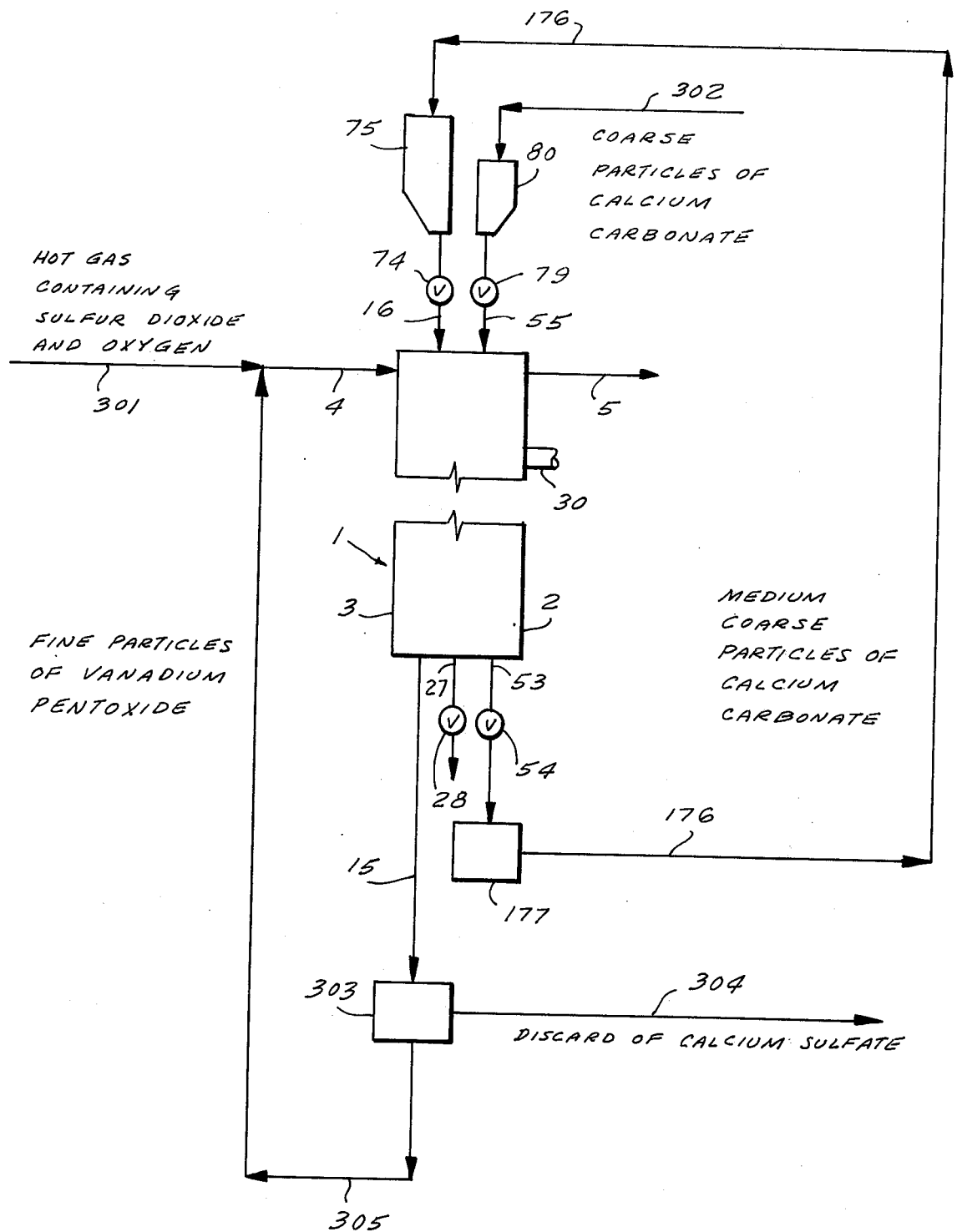
FIG. 4 is a schematic diagram illustrating use of the invention in a process for removing sulfur dioxide from a hot gas containing sulfur dioxide and oxygen.

FIG. 4 illustrates an alternative procedure for removing sulfur dioxide from such products of combustion, especially advantageous in the case of the combustion of a fuel oil containing vanadium as well as sulfur. In this special case, hot combustion product gas from line 301 will contain fine particles of vanadium pentoxide fume, on the order of 1 micron in size, as well as sulfur dioxide and oxygen. These particles are catalytic toward conversion of sulfur dioxide by oxygen to sulfur trioxide. The gas is preferably at a temperature around 800° to 900°F. Accumulation of the particles, preferably together with an admixture of larger particles, preferably between about 5 and 100 microns in size, at gas entry faces 39 of panel bed 1 will bring about the aforementioned conversion. The granular material of panel bed 1 is preferably absorptive toward sulfur trioxide, and the material is suitably calcium carbonate, as shown in FIG. 4. Particles of this solid, suitably between about 10 and 14 mesh in size, are supplied to hopper 80 and cause to flow either continuously or intermittently through valve 79, pipe 55, bed spaces 48, 49, and 50 of panel bed 1 (seen in FIG. 1), pipe 53, and valve 54 to crushing means 177 where the particles are reduced in size, suitably to between about 20 and 100 mesh in size. The reduced particles are supplied from means 177 to hopper 75 via pipe 176. Particles of vanadium pentoxide are advantageously admixed to the calcium carbonate particles in hopper 75 to promote conversion of sulfur dioxide to sulfur trioxide within bed 18 as well as at the surface deposits. Spilled solids from pipe 15 are treated in means 303 for separating calcium carbonate particles partially converted to calcium sulfate, for discard via line 304, and preferably also for pelletizing or agglomerating the fume particles of vanadium pentoxide to provide larger particles of this substance, preferably of the aforementioned size between about 5 and 100 microns. These larger particles are then advantageously returned to pipe 4 via pipe 305. Vanadium pentoxide is valuable, and some of it is advantageously withdrawn from pipe 305 for sale.

The procedure of FIG. 4 can also be used to remove sulfur dioxide from products of combustion of a fuel that does not contain vanadium, or from other gases that contain both sulfur dioxide and oxygen, with supply of vanadium pentoxide catalyst particles from an external source.

It should be noted that the porosity of granular material bed 18 should be brought initially to the uniform porosity appropriate for the puffback intensity selected for operation, as discussed more fully in my aforementioned application number 1, "Treating Gas and Granular Material in Panel Bed". Specifically, it is advantageous to subject the panel bed initially to a strong puffback at an intensity exceeding that contemplated for subsequent operations, or to discharge a controlled quantity of granular material from the bottom of the panel bed.

I do not wish my invention to be limited to the particular embodiments illustrated in the drawings and described above in detail. Other arrangements will be recognized by study of my aforementioned co-pending applications and by those skilled in the art, as well as purposes other than those discussed herein which the invention can advantageously serve.

I claim:
1. The method of treating a gas involving its contacting with a fine granular medium catalytic toward a chemical reaction by a chemical species present in the gas, comprising:
   a. arranging a granular material smaller than about 20 mesh in a panel bed having a plurality of transversely disposed upwardly spaced gas entry portions separated by interposed supporting members having outer and inner edges with respect to the bed wherein said gas entry portions have gas entry faces substantially contiguous with said outer edges and wherein said bed has gas exit portions spaced from said inner edges;
   b. forwardly flowing gas through the gas entry portions of the granular material bed and outwardly from the gas exit portions while adding to said gas a granular medium substantially smaller than about 120 mesh to separate and accumulate said medium in surface layer deposits at said gas entry faces wherein said gas enters said gas entry faces at a velocity greater than about 16 feet per minute during at least a part of this step (b);
   c. thereafter causing a transient flow of gas to move in the direction in reverse to the flow of said gas in (b);
   d. said transient reverse flow producing first a rise at a given rate of rise and subsequently a fall in the pressure difference between said gas exit portions and said gas entry portions, said difference produced by said transient reverse flow remaining greater than a first critical minimum difference for a time interval of less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of said granular material toward said gas entry faces to spill a portion of the granular material and substantially all of said accumulated granular medium from the bed;
   e. supplying fresh granular material to replace material spilled from said gas entry portions;
   f. repeating the cycle of said steps (b), (c), (d), and (e) at least two times and then repeating step (b);
   g. forwardly flowing gas to be treated through the gas entry portions of the granular material bed and outwardly from the gas exit portions to treat said gas by contact with said surface layer deposits of said medium, wherein said medium is catalytically active toward a chemical reaction by a chemical species present in said gas to be treated, and wherein either at least a first part of this step (g) occurs simultaneously with a said step (b), the gas in (b) comprising the gas to be treated, or this step (g) is wholly subsequent to said step (b); and
   h. thereafter repeating steps (c), (d), (e), (b), and (g) in a cyclic manner.

2. The method of claim 1 in which said gas of step (b) enters said gas entry faces at a velocity greater than about 30 feet per minute to accumulate a first portion of said deposits and wherein subsequently said gas of (b) enters said gas entry faces at a second velocity below about 16 feet per minute to accumulate a second portion of the deposits and to substantially close up pinholes present in said first portion.

3. The method of claim 2 wherein said gas to be treated is the product of combustion of a residual fuel oil containing sulfur and vanadium and wherein said fine catalytic granular medium is vanadium pentoxide including fume particles containing vanadium pentoxide and arising from said combustion.

4. The method of claim 3 wherein said granular material is absorptive in respect to sulfur trioxide.

5. The method of claim 4 wherein said granular material is calcium carbonate or lime or half-calcined dolomite or fully-calcined dolomite.

6. The method of claim 1 wherein said gas to be treated is a gas containing sulfur dioxide and oxygen and wherein said fine catalytic granular medium of step (b) contains vanadium pentoxide and wherein said granular material of step (a) is a species absorptive in respect to sulfur trioxide, selected from the group consisting of calcium carbonate, lime, half-calcined dolomite, or fully-calcined dolomite.

7. The method of claim 1 wherein said gas to be treated contains sulfur dioxide and wherein said fine granular medium of step (b) is catalytic for the reaction of sulfur dioxide with hydrogen sulfide to form elemental sulfur and wherein said granular material of step (a) is adsorptive or absorptive toward sulfur and including the step of adding hydrogen sulfide to said gas to be treated.

8. The method of claim 7 wherein said granular material is an activated carbon.

9. The method of claim 1 wherein said gas to be treated is a gas containing sulfur dioxide and wherein said fine granular medium of step (b) is catalytic for the reduction of sulfur dioxide by carbon monoxide to yield sulfur and wherein said granular material of step (a) is adsorptive or absorptive toward sulfur and including the step of adding carbon monoxide to said gas to be treated.

10. The method of claim 9 wherein said granular material is an activated carbon.

11. The method of claim 1 wherein said gas to be treated contains particulate matter and wherein said spill from said gas entry faces in (h) includes accumulated particulate matter removed from said gas to be treated.

* * * * *